US012691958B2

(12) United States Patent　　　　(10) Patent No.:　US 12,691,958 B2

Bolay et al.　　　　　　　　　　　　　(45) Date of Patent:　　Jul. 28, 2026

(54) MOTOR VEHICLE WITH A REAR SPOILER

(71) Applicant: Dr. Ing. h.c. F. Porsche Aktiengesellschaft, Stuttgart (DE)

(72) Inventors: Philipp Bolay, Flacht (DE); Christian Rommelfanger, Bad Liebenzell (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 386 days.

(21) Appl. No.: 18/483,692

(22) Filed: Oct. 10, 2023

(65) Prior Publication Data

US 2024/0116581 A1　　　Apr. 11, 2024

(30) Foreign Application Priority Data

Oct. 11, 2022　(DE) ..................... 10 2022 126 266.9

(51) Int. Cl.
B62D 35/00　　　　(2006.01)
B60R 21/34　　　　(2011.01)

(52) U.S. Cl.
CPC ............ B62D 35/007 (2013.01); B60R 21/34 (2013.01); B60R 2021/346 (2013.01)

(58) Field of Classification Search
CPC .. B62D 35/007; B62D 35/005; B62D 35/008; B60R 21/34; B60R 2021/346; B60R 19/02; Y10S 180/903

USPC ...................................................... 296/180.1
See application file for complete search history.

(56) References Cited

FOREIGN PATENT DOCUMENTS

| DE | 2340308 | A1 | | 2/1975 | | |
|----|---------|----|--|--------|--|--|
| DE | 2851639 | A1 | | 6/1980 | | |
| DE | 102006001785 | A1 | | 4/2007 | | |
| DE | 102006011784 | A1 | | 4/2007 | | |
| DE | 102013223973 | A1 | | 5/2015 | | |
| DE | 102021127330 | B3 | | 12/2022 | | |
| EP | 3789276 | A1 | * | 3/2021 | ........... | B62D 35/007 |
| KR | 20020040365 | A | | 5/2002 | | |
| WO | WO-2021243722 | A1 | * | 12/2021 | ............. | B62D 37/02 |

* cited by examiner

*Primary Examiner* — Amy R Weisberg
*Assistant Examiner* — Philip C Adams
(74) *Attorney, Agent, or Firm* — Buchanan Ingersoll & Rooney PC

(57)　　　　　　　　ABSTRACT

A motor vehicle having a rear spoiler that is rigidly attached to a bearing structure of the motor vehicle in a normal position. In order to functionally improve the motor vehicle, the rear spoiler rigidly attached to the bearing structure in its normal position is displaceably attached to the support structure such that the rear spoiler is displaced to a safety position by a translation device in the event of an imminent collision detected by a sensor.

2 Claims, 5 Drawing Sheets

MOTOR VEHICLE WITH A REAR SPOILER

CROSS-REFERENCE TO RELATED APPLICATION

This application claims priority to German Patent Application No. 10 2022 126 266.9, filed Oct. 11, 2022, the content of such application being incorporated by reference herein in its entirety.

FIELD OF THE INVENTION

The invention relates to a motor vehicle having a rear spoiler that is rigidly attached to a bearing structure of the motor vehicle in a normal position.

BACKGROUND OF THE INVENTION

From the German publication DE 28 51 639 A1, which is incorporated by reference herein, a motor vehicle with an adjustable air guiding element is known, which does not extend beyond an adjacent motor vehicle body in a retracted position and thereby reduces the risk of injury. Korean patent summary KR 20020040365 A, which is incorporated by reference herein, discloses a motor vehicle having a pedestrian protection device. The German publication DE 23 40 308 A, which is incorporated by reference herein, discloses a motor vehicle with a rigid rear spoiler, which is designed to be compliant and thereby reduces the risk of injury to a motorcyclist in the event of a collision.

SUMMARY OF THE INVENTION

Described herein is a motor vehicle having a rear spoiler that is rigidly attached to a bearing structure of the motor vehicle in a normal position.

The rear spoiler is displaceably attached to the bearing structure, such that the rear spoiler is displaced to a safety position by a translation device in the event of an imminent collision detected by a sensor device (e.g., camera, lidar, radar, etc.). In contrast to the adjustable air guiding element known from the German publication DE 28 51 639 A1 referred to at the start, the rear spoiler is rigidly attached to the bearing structure of the claimed motor vehicle and is not designed to be adjustable. In contrast to the rigid rear spoiler, also disclosed in the German publication DE 23 40 308 A, referred to at the start, which is designed to be compliant, the rear spoiler for the claimed motor vehicle can also be formed from a rigid material that is not compliant or deformable. The rigid rear spoiler of the claimed motor vehicle may also have sharp edges that provide aerodynamic advantages, but also increase the risk of injury in the event of a collision. With the aid of the translation device, the rear spoiler of the claimed vehicle is advantageously displaced into a rear region of the motor vehicle such that no structures of the rear spoiler project over the rear region or out of the rear region of the motor vehicle. This can significantly reduce the risk of injury for a rider of a bicycle, scooter or motorbike in the event of a collision.

A preferred exemplary embodiment of the motor vehicle is characterized in that the translation device is combined with a locking device by which the rear spoiler is rigidly held in its normal position. Thus, the aerodynamic function of the rear spoiler can be maintained during operation of the motor vehicle, in particular with a relatively rigid and sharp-edged rear spoiler, even at extreme speeds and loads.

Another preferred exemplary embodiment of the motor vehicle is characterized in that the translation device comprises a translation slide that is blocked with the locking device to keep the rear spoiler rigidly in its normal position and that is translationally movable to allow the rear spoiler to be moved to its safety position in the event of an imminent collision detected by the sensor device. The translation slide can preferably be displaced in a z-direction of the motor vehicle. A z-direction is referred to as a direction of the height of the motor vehicle. Analogously, a motor vehicle longitudinal direction is also referred to as the x-direction. A transverse direction of the motor vehicle is also referred to as a y-direction. The translation slide is guided in or on the bearing structure in the desired direction of movement. The translation slide may be passively released via the locking device to enable a retraction of the rear spoiler. However, the translation slide may also be actively shifted to initiate a desired retraction of the rear spoiler in a detected imminent collision. With the translation slide, the presumed disadvantage of an additional component is also considered. However, this provides the advantage among others that the rear spoiler does not have to be changed or only insignificantly. The rear spoiler may be directly or indirectly connected to the translation slide.

A further preferred exemplary embodiment of the motor vehicle is characterized in that the translation device comprises an expansion drive charge, by means of which the rear spoiler can be actively driven to shift the rear spoiler from its rigid normal position to its safety position in the event of an imminent collision detected by the sensor device. For example, the expansion drive charge is an expansion drive charge as used in connection with airbags in a motor vehicle. The expansion drive charge is particularly advantageously connected to a controller via which at least one airbag of the motor vehicle equipped with the rear spoiler is triggered. Thus, particularly advantageously, the rear spoiler can be actively shifted to its safety position simultaneously with a triggering of at least one airbag, when the rear spoiler is released by the translation device.

A further preferred exemplary embodiment of the motor vehicle is characterized in that the translation device comprises a coupling element coupled to the rear spoiler, which is translationally movable relative to the translation slide when the translation slide pretensioned by a translation spring is released by the locking device. Here, the presumed disadvantage of an additional coupling element is also taken into consideration to advantageously ensure that the rear spoiler is not unintentionally shifted to its safety position under extreme loads or speeds of the motor vehicle.

A further preferred exemplary embodiment of the motor vehicle is characterized in that the translation slide has a locking recess, in which a locking element with a pretensioned locking spring which can be magnetically activatable engages, which is movable in a blocking body fixedly connected to the bearing structure against the pretension force of the locking spring, wherein the blocking body has a blocking surface against which the coupling element rests with an end surface as long as the translation slide is not released by the locking device. Thus, it is easily prevented that extreme loads on the rear spoiler will lead to an unintended and unnecessary retraction of the rear spoiler.

A further preferred exemplary embodiment of the motor vehicle is characterized in that the translation slide comprises a first sliding surface which interacts with a second sliding surface provided on the coupling element, wherein the coupling element has a third sliding surface which interacts with a fourth sliding surface provided on the blocking body. This allows for a particularly stable connection of the rear spoiler to the bearing structure, wherein the desired safety function is simultaneously enabled in the event of a detected imminent collision.

A further preferred exemplary embodiment of the motor vehicle is characterized in that the locking device comprises a toggle lever kinematics with two toggle levers associated with the translation slide, by which the rear spoiler is rigidly held in its normal position. With the toggle lever kinematics mechanism, the rear spoiler can be kept extremely stably in its normal position. This ensures a desired function of the rear spoiler in the operation of the motor vehicle, even under extreme loads and speeds.

A further preferred exemplary embodiment of the motor vehicle is characterized in that the toggle lever kinematics mechanism can be activated via an electromotively driven lifting spindle shaft in order to shift the rear spoiler from its rigid normal position to its safety position in the event of an imminent collision detected by the sensor device. Via the electromotively driven lifting spindle shaft, the rear spoiler can be quickly and securely shifted to its safety position. Inadvertent movements of the lifting spindle shaft relative to the electromotive drive may be prevented, for example, by the lifting spindle shaft being provided with a self-locking thread.

The invention further relates to a translation device, in particular to a translation slide and/or a translation spring, a locking device, in particular a locking element and/or a locking spring, a coupling element, a blocking body, a toggle lever kinematics mechanism, in particular a toggle lever and/or a lifting spindle shaft for a previously described motor vehicle. The aforementioned parts can be handled separately.

The invention may also relate to a method for operating a previously described motor vehicle, wherein the rear spoiler is actively shifted to its safety position by the translation device in the event of an imminent collision detected by a sensor device.

BRIEF DESCRIPTION OF THE DRAWINGS

Further advantages, features, and details of the invention arise from the following description, in which various exemplary embodiments of the invention are described in detail with reference to the drawing. The FIGS. show.

DETAILED DESCRIPTION OF THE INVENTION

Figure 5:
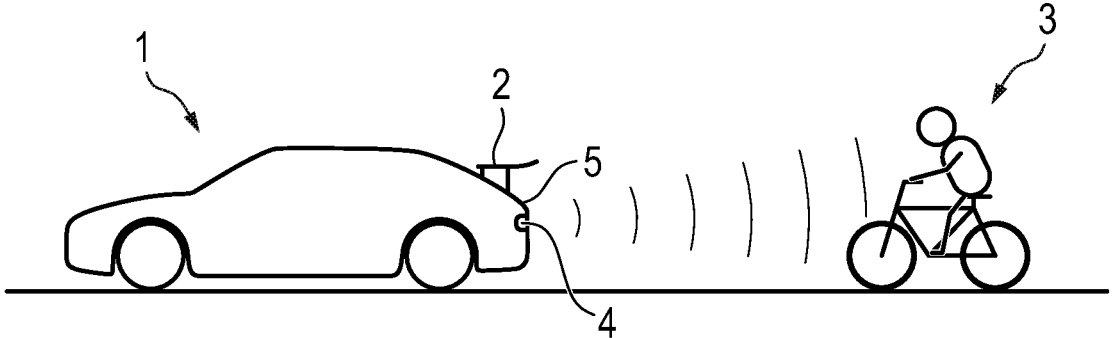
FIG. 5 is a highly simplified illustration of a motor vehicle with a rigid rear spoiler and a two-wheeled rider approaching the motor vehicle from the rear.
Figure 6:
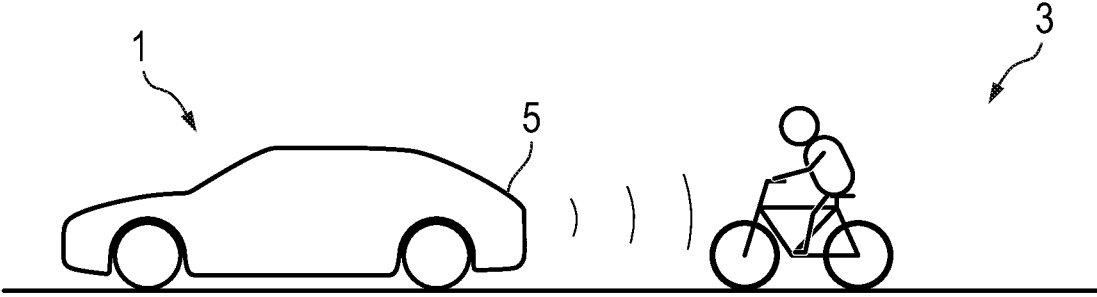
FIG. 6 shows the motor vehicle of FIG. 5, wherein the rear spoiler is fully retracted into the rear.

In FIGS. 5 and 6, a motor vehicle 1 with a rear spoiler 2 is shown schematically. As can be seen in FIG. 5, the rear spoiler 2 is rigidly attached to the rear 5 of the motor vehicle 1. Behind the motor vehicle 1, a two-wheeled rider 3 approaches the rear 5 of the motor vehicle 1.

A sensor device 4 detects the two-wheeled rider 3 approaching the motor vehicle 1 from the rear. If the sensor device 4 detects an imminent collision, then the rear spoiler 2 is automatically shifted from its normal position shown in FIG. 5 to its safety position illustrated in FIG. 6. A computer having a controller, processor, software etc. may communicate with both sensor device 4 and a translation device for controlling movement of spoiler 2 based on the readings of sensor device 4.

In FIG. 6, the rear spoiler is fully retracted into the rear 5 of the motor vehicle 1. This ensures a simple way to prevent injuries to the two-wheeled rider 3 caused by the rear spoiler in the event of a collision.

In FIGS. 1, 2 and 3, 4, two exemplary embodiments of a translation device 10; 30, respectively, are shown in section. The translation device 10; 30 is combined with a locking device 20; 40 by which the rear spoiler is kept in its normal position during normal operation of the motor vehicle.

The translation device 10; 30 comprises a translation slide 15; 35, which is translationally movable preferably in a vehicle height direction, also referred to as the z-direction, in order to enable the rear spoiler to be moved to its safety position in the event of an imminent collision detected by the sensor device.

Figure 1:
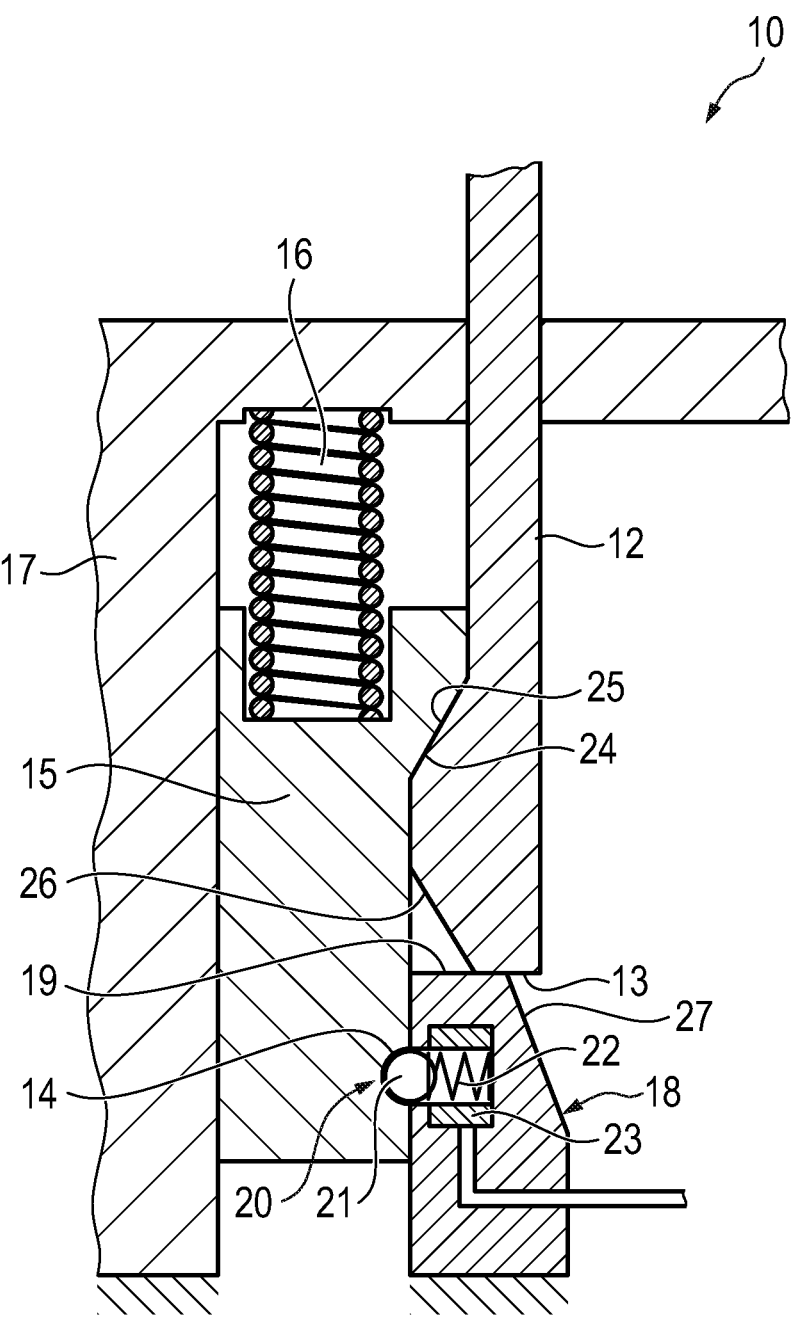
FIG. 1 is a sectional view of a first exemplary embodiment of a translation device having a translation slide, a coupling element and a locking device that is locked to rigidly hold a rear spoiler of a motor vehicle in a normal position.
Figure 2:
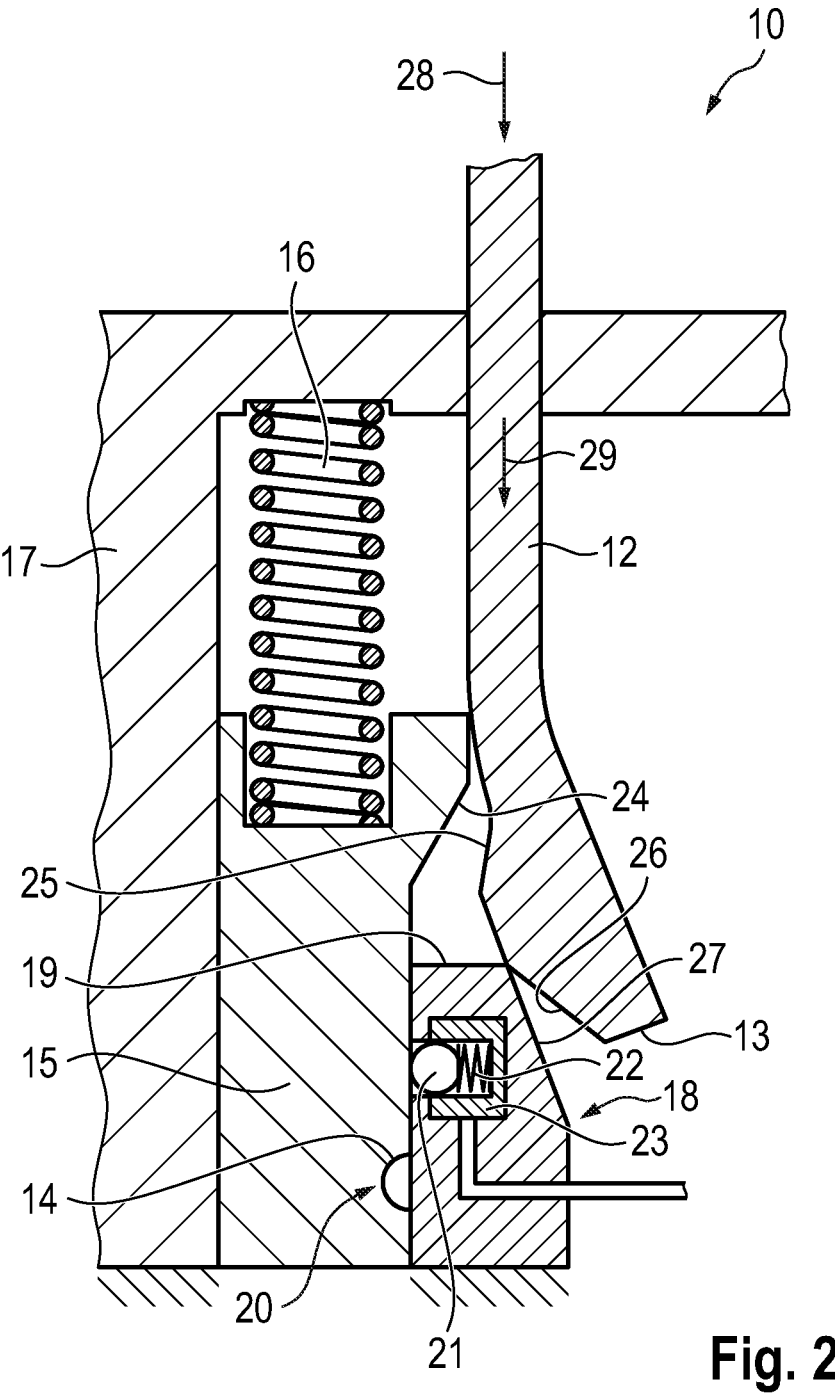
FIG. 2 is the same sectional view as in FIG. 1 with the locking device open to allow the rear spoiler to retract into a safety position.

The translation device 10 shown in section in FIGS. 1 and 2 comprises a coupling element 12 in addition to the translation slide 15. As can be seen in FIG. 1, the coupling element 12 rests with end surface 13 on a blocking surface 19 of a blocking body 18. The blocking body 18 is fixedly connected to a bearing structure 17 of the motor vehicle. The translation slide 15 pretensioned downwards by a translation spring 16 in FIG. 1 is blocked by the locking device 20.

The locking device 20 comprises a locking element 21 designed as a ball, which in FIG. 1 is pretensioned from right to left by a locking spring 22. The locking element 21 can be shifted in a horizontal direction in a ring body 23 in FIG. 1.

The ring body 23 is integrated into the blocking body 18. The pretension force of the locking spring 22 holds the locking element 21 in a locking recess 14 provided in the translation slide 15. This prevents movement of the translation slide 15.

In the rest state shown in FIG. 1, the translation slide 15 is locked by the locking element 21 in its illustrated position. By activating a magnetic field, the locking element 21 in FIG. 1 is translationally retracted to the right, thereby releasing the translation slide 15, as can be seen in FIG. 2. In FIG. 2, the lock is released to allow for a downward travel of the rear spoiler as indicated in FIG. 2 by arrows 28 and 29.

The translation slide 15 has a first sliding surface 24 on which a second sliding surface 25 rests in FIG. 1, which is formed on the coupling element 12. A third sliding surface 26 is also formed on the coupling element 12, with which a free end of the coupling element 12 slides off on the barrier body 18, as seen in FIG. 2, which has a fourth sliding surface 27.

When the translation slide 15 is released by the locking element 21, the translation slide 15 moves downwards due to the pretension force of the relatively strong translation spring 16. The downward translational movement of the translation slide 15 in FIGS. 1 and 2 ensures that the free end of the coupling element 12 protrudes laterally as can be seen in FIG. 2 by the interaction of the sliding surfaces 24 to 27. Thus, the coupling element 12 may move downwards with the rear spoiler as indicated by arrows 28 and 29 in FIG. 2. Retracting the spoiler reduces the risk of injury. Element 12 may be directly connected or form part of the rear spoiler.

For example, the rear spoiler is driven by an expansion drive charge, which is not shown. The expansion drive charge provides the downward movement of the coupling member 12 with the rear spoiler.

It is also conceivable to realize a rotational movement of the spoiler during the retraction by a kinematics mechanism. By rotating the spoiler in this way, a hard impact of another vehicle involved in the accident may be converted into a sliding movement, thereby advantageously reducing the energy input into the other vehicle involved in the accident.

Figure 3:
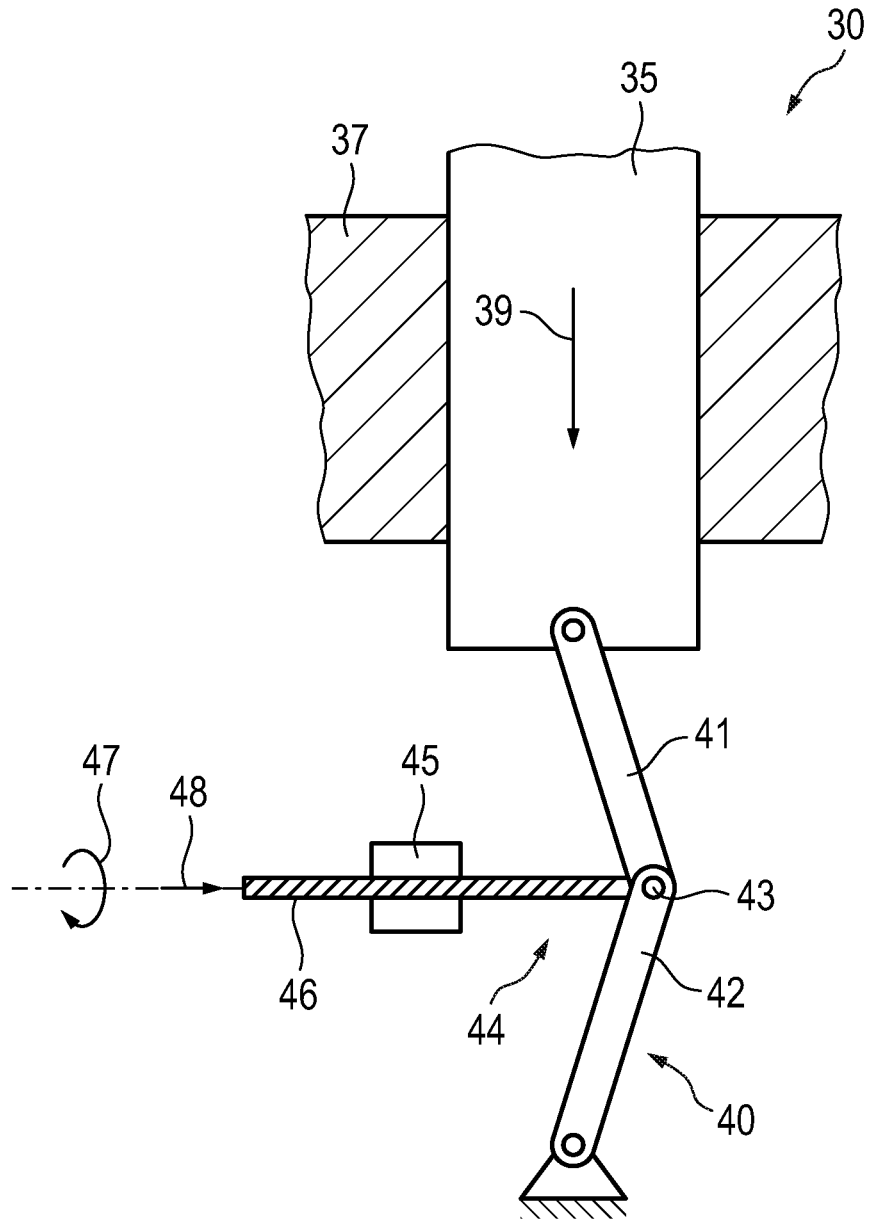
FIG. 3 is as a sectional view of a second exemplary embodiment of a translation device having a toggle lever kinematics mechanism in a locked position.
Figure 4:
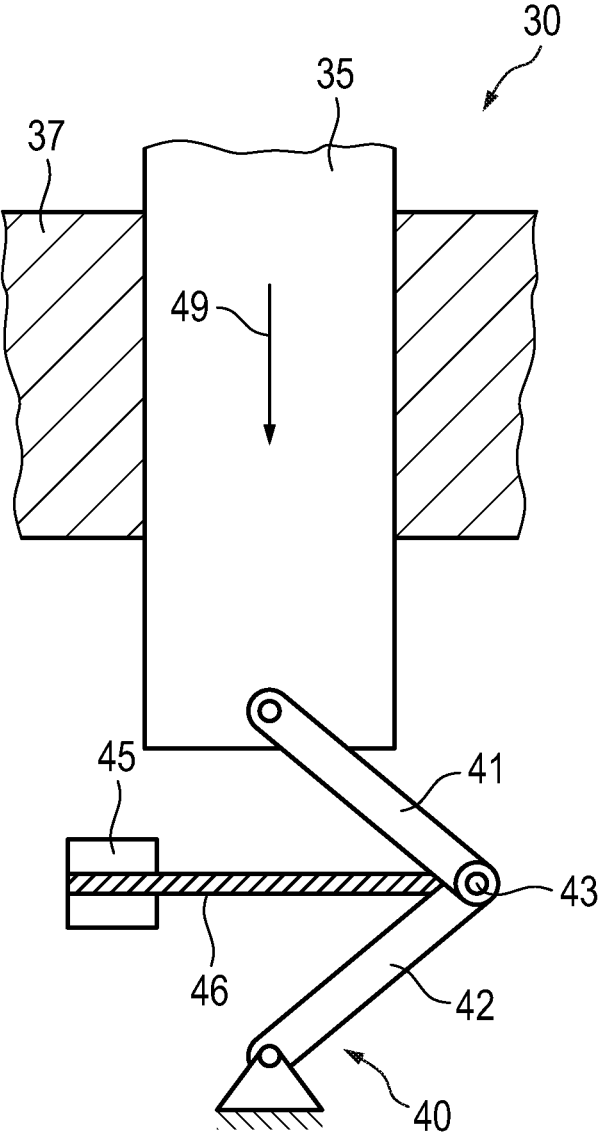
FIG. 4 shows the translation device of FIG. 3 when retracting the translation slide via the toggle lever kinematics mechanism.

In the exemplary embodiment shown in FIGS. 3 and 4, the locking device 40 for the translation slide 35 of the translation device 30 is configured with a toggle lever kinematics mechanism 44. The toggle lever kinematics mechanism 44 comprises a toggle lever 41, one end of which is hinged to the translation slide 35. A second end of the toggle lever 41 is hinged to a first end of a toggle lever 42 in a joint 43. A second end of the toggle lever 42 is hinged to a bearing structure 37 of the motor vehicle.

As indicated in FIG. 3 by an arrow 39, the translation slide is guided translationally downwards in the bearing structure 37. In FIG. 3, movement of the translation slide 35 in the direction of the arrow 39 is prevented by the toggle lever kinematics mechanism 44.

At the joint 43 connecting the two toggle levers 41 and 42 together, a horizontally arranged lifting spindle shaft 46 engages. The lifting spindle shaft 46 can be displaced to the right by an electric motor drive 45 via interlocking threads not shown in greater detail in FIG. 3, as indicated in FIG. 3 by an arrow 48. The movement of the lifting spindle shaft 46 is initiated by a twist of the lifting spindle shaft 46 indicated in FIG. 3 by an arrow 47. Rotation 47, in turn, is initiated by the electromotive drive 45.

In FIG. 4, an arrow 49 indicates that the translation slide 35 is displaced downwards using the toggle lever kinematics mechanism 44 when the lifting spindle shaft 46 is displaced to the right by the electromotive drive 45 in FIG. 4.

The retraction of the rear spoiler can also be effected here, for example by expansion drive charge.

REFERENCE NUMBERS

1 Motor vehicle
2 Rear spoiler
3 Two-wheeled rider
4 Sensor device
5 Rear
10 Translation device
12 Coupling element
13 End surface
14 Locking recess
15 Translation slide
16 Translation spring
17 Bearing structure
18 Blocking body
19 Blocking surface
20 Locking device
21 Locking element
22 Locking spring

6

23 Ring body
24 First sliding surface
25 Second sliding surface
26 Third sliding surface
27 Fourth sliding surface
28 Arrow
29 Arrow
30 Translation device
35 Translation slide
37 Bearing structure
39 Arrow
40 Locking device
41 Toggle lever
42 Toggle lever
43 Joint
44 Toggle lever kinematics mechanism
45 Drive
46 Lifting spindle shaft
47 Arrow
48 Arrow
49 Arrow

What is claimed is:

1. A motor vehicle comprising:
a rear spoiler which is displaceably attached to a bearing structure of the motor vehicle,
a sensor device for detecting an imminent collision involving the motor vehicle, and
a translation device that is configured to displace the rear spoiler from a normal operation position to a safety position in an event that the sensor device detects the imminent collision,
wherein the translation device is combined with a locking device by which the rear spoiler is rigidly held in the normal operating position,
wherein the translation device comprises a translation slide that is blocked with the locking device to rigidly maintain the rear spoiler in the normal operation position and that is translationally movable to allow the rear spoiler to be moved to the safety position in the event of the imminent collision detected by the sensor device,
wherein the translation device comprises a coupling element coupled to the rear spoiler, which is translationally movable relative to the translation slide when the translation slide pretensioned by a translation spring is released by the locking device, and
wherein the translation slide has a locking recess, in which a locking element with a pretensioned locking spring which is configured to be magnetically activatable engages, which is moveable in the blocking body fixedly connected to the bearing structure against the pretension force of the locking spring, wherein the blocking body has a blocking surface against which the coupling element rests with an end surface, as long as the translation slide is not released by the locking device.

2. The motor vehicle of claim 1, wherein the translation slide comprises a first sliding surface which interacts with a second sliding surface disposed on the coupling element, wherein the coupling element has a third sliding surface which interacts with a fourth sliding surface disposed on the blocking body.

* * * * *